(12) United States Patent
Ramirez et al.

(10) Patent No.: US 7,496,060 B2
(45) Date of Patent: Feb. 24, 2009

(54) EXTENDING BATTERY LIFE IN COMMUNICATION DEVICES HAVING A PLURALITY OF RECEIVERS

(75) Inventors: Dalier J. Ramirez, Boca Raton, FL (US); James David Hughes, Boynton Beach, FL (US); Ronald R. Rockwell, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 608 days.

(21) Appl. No.: 11/134,712

(22) Filed: May 20, 2005

(65) Prior Publication Data

US 2006/0262739 A1 Nov. 23, 2006

(51) Int. Cl.
*H04B 1/38* (2006.01)

(52) U.S. Cl. .................. 370/311; 370/318; 370/328; 455/573; 455/574

(58) Field of Classification Search .............. 370/310, 370/310.2, 311, 328, 329, 331, 338, 334; 455/573, 574, 132, 133, 134, 343.2, 343.5, 455/552.1, 553.1, 168.1
See application file for complete search history.

(56) References Cited

U.S. PATENT DOCUMENTS

| | | | |
|---|---|---|---|
| 4,943,803 A | 7/1990 | Vrijkorte | |
| 5,054,052 A | 10/1991 | Nonami | |
| 5,117,449 A | 5/1992 | Metroka et al. | |
| 5,228,053 A | 7/1993 | Miller et al. | |
| 5,239,306 A | 8/1993 | Siwiak et al. | |
| 5,438,701 A * | 8/1995 | Yamada et al. | 455/574 |
| 5,541,976 A | 7/1996 | Ghisler | |
| 5,566,364 A * | 10/1996 | Mizoguchi et al. | 455/132 |
| 5,606,313 A | 2/1997 | Allen et al. | |
| 5,735,707 A * | 4/1998 | O'Groske et al. | 439/446 |
| 5,737,707 A | 4/1998 | Gaulke et al. | |
| 5,745,860 A * | 4/1998 | Kallin | 455/574 |
| 5,790,946 A | 8/1998 | Rotzoll | |
| 5,805,989 A * | 9/1998 | Ushida | 455/343.2 |
| 5,838,720 A | 11/1998 | Morelli | |
| 6,255,944 B1 | 7/2001 | Addy | |
| 6,473,601 B1 * | 10/2002 | Oda | 455/132 |
| 6,678,508 B1 * | 1/2004 | Koilpillai et al. | 455/137 |
| 7,024,168 B1 * | 4/2006 | Gustafsson et al. | 455/135 |
| 7,133,702 B2 * | 11/2006 | Amerga et al. | 455/574 |
| 2004/0114553 A1 * | 6/2004 | Jiang et al. | 370/328 |
| 2005/0181731 A1 * | 8/2005 | Asghar et al. | 455/63.1 |

* cited by examiner

*Primary Examiner*—Jean A Gelin
(74) *Attorney, Agent, or Firm*—Charles W. Bethards (57) ABSTRACT

A method (300) of extending battery life in a communication device having a plurality of receivers includes receiving information with a primary receiver that is configured to operate on a first network (303) and controlling a secondary receiver that is configured to operate on a second network that is independent from the first network in accordance with the information obtained with the primary receiver. A corresponding communication device (201) includes: a primary receiver (221) configured to operate on a first network (203); a secondary receiver (227, 233) configured and arranged to operate as a short range receiver with an access point (205, 207) that is independent of the first network; and a controller (225, 231, 237) that is configured to control the secondary receiver in accordance with information obtained from the primary receiver.

17 Claims, 5 Drawing Sheets

FIG. 6

EXTENDING BATTERY LIFE IN COMMUNICATION DEVICES HAVING A PLURALITY OF RECEIVERS

FIELD OF THE INVENTION

This invention relates in general to communication devices (mobile or portable) and more specifically to methods and apparatus for extending battery life in devices where these devices have a plurality of receivers.

BACKGROUND OF THE INVENTION

Communication devices and specifically portable communication devices such as cellular handsets or devices are known. Battery life for these devices is an important attribute since that is a major contributor to user satisfaction and convenience. Shorter battery life means that a battery will need to be recharged more often and that the likelihood of service failure due to insufficient battery charge will increase for a given user. Larger batteries could be used, but that would have a detrimental impact on device size, weight, and cost.

Typically, battery life is determined by power consumption of the device when it is in a standby condition, i.e., simply waiting to perform some communication function, since that is what the majority of communication devices are doing for most of the time. Wide area system architects are familiar with this issue and normally design access protocols and the like so that devices associated with the network can spend much of their time in a sleep mode whereby power consumption is minimized by powering down much of the circuitry of the device.

However, the functionality of communication devices continues to increase. For example, users are now demanding and purveyors of devices are thus including multiple receivers in these devices where these receivers are operable on independent services and networks. Multiple receivers that may be concurrently operable often result in an adverse impact on battery life

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communication devices, e.g., mobile or portable devices, and more specifically extending battery life in such devices that include a plurality of receivers. More particularly various inventive concepts and principles embodied in methods and apparatus, e.g. communication devices and integrated circuits, for controlling a secondary receiver in accordance with information received from a primary receiver in order to extend battery life will be discussed and disclosed.

The communication units or devices of particular interest may vary widely but include cellular handsets, messaging devices and other devices with wireless connectivity suitable for utilizing a wide area network (WAN), e.g., a public access subscriber network, and short range access, i.e., a personal or local area network (PAN, LAN or WLAN) or other Unlicensed Mobile Access system. By way of example and not limitation, the communication unit may have a primary WAN receiver arranged for service on a Global System for Mobile (GSM) or Code Division Multiple Access (CDMA or WCDMA) network and one or more short range receivers, arranged for service with one or more access points using, e.g., IEEE 802.11, IEEE 802.15, IEEE 802.16 (WiMAX), Bluetooth, IEEE 802.15.3 Ultra Wide Band (UWB), or the like access protocols.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
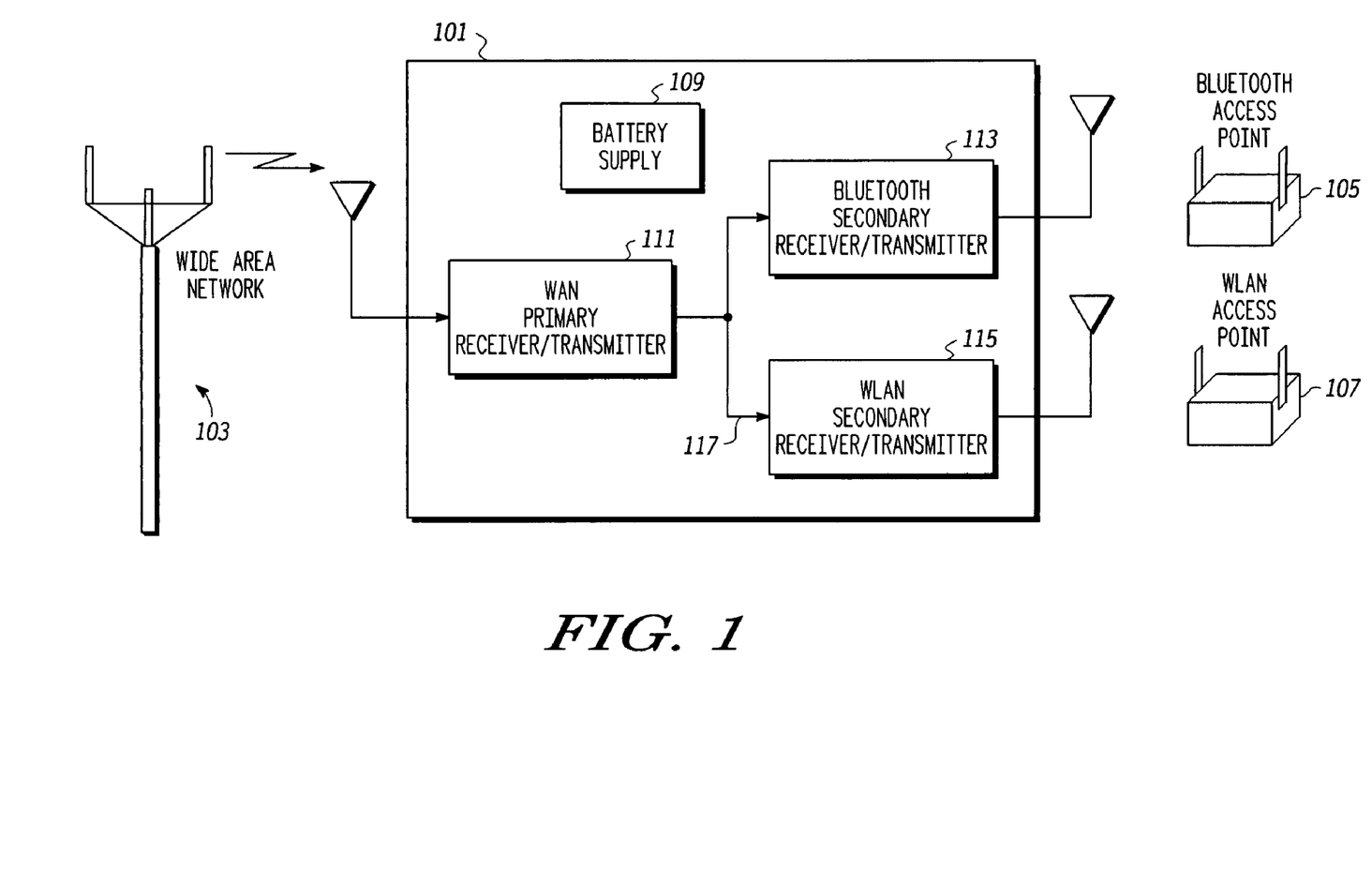
FIG. 1 depicts in a simplified and representative form, a high level diagram of a communication device with a plurality of receivers in accordance with one or more embodiments.

Referring to FIG. 1, a simplified and representative high level diagram of a communication device with a plurality of receivers that uses one or more methods and apparatus for extending battery life or conserving battery resources or battery charge will be briefly discussed and described. In FIG. 1, a communication device 101 such as a handheld portable or mobile cellular handset or phone is shown. The communication device 101 is arranged to connect with and obtain service from a wide area network (WAN) 103 such as cellular network or the like. The device is also arranged and configured to access and obtain service from one or more short range access points, such as access points for a Bluetooth or other personal area network (PAN) 105, wireless local area network (WLAN) 107, UWB (not shown), or the like. The communication device can be a battery powered device that includes capability to access a GSM or CDMA cellular network or other public access subscriber network as well as one or more of a Bluetooth, 802.11 or other WLAN, UWB or other unlicensed mobile access (UMA) based network or respective access points.

The communication device 101, as shown, includes a battery based power supply 109 that provides supply voltages to a WAN function or modem 111 that is the primary service access apparatus for the communication device. The WAN modem 111 includes a primary receiver and transmitter (primary transceiver) that are configured to operate on or with a first, e.g., WAN, network. The supply 109 also provides one or more supply voltages to one or more secondary functions including secondary receivers and transmitters (secondary transceivers), such as a Bluetooth transceiver 113, WLAN transceiver 115, UWB transceiver (not shown) or the like. The secondary transceivers, thus receivers, are configured and arranged to operate as short range transceivers, thus receivers, with, respective, Bluetooth or WLAN access points 105, 107 or the like. The access points 105, 107 are independent from and uncorrelated with the first or WAN network 103 or the functioning or operation of this network. Furthermore much of the time the communication device 101 may not be sufficiently close to an access point to establish a connection thereto. In the discussions below it is understood that reference to a WAN means reference to any public access subscriber network and that reference to a Bluetooth or WLAN includes reference to any UMA access point.

Examples of available communication devices that include a primary transceiver and secondary transceiver include 1) cellular phones or handsets that normally operate on or access a wide area network and that also have access to a wireless LAN, when, for example, the communication device is in or near to a local coffee house or airport and 2) cellular phones that include a Bluetooth transceiver for access, for example, to automotive sound systems or other automotive based accessory functions when the phone is in or near to a Bluetooth equipped automobile. Unfortunately the primary and secondary transceivers in available communication devices essentially operate independently given that their respective networks are independent and uncorrelated, i.e., not commonly managed, not common media access procedures, e.g., not synchronized networks. This means that even if the primary network and secondary network include protocols that possibly conserve battery power, the communication device must support at least two independently operating transceivers or receivers. Thus at least any common functions, such as power supplies, possibly busses, and the like may be enabled or awake or powered up much more of the time and much more often than if only one transceiver was present.

In stark contrast and advantageously as reflected by the bus 117 and discussed in detail below, one or more embodiments in accordance with the present invention utilize information provided by the primary transceiver via, for example, the first or primary network, to facilitate control, e.g. wake up, the secondary transceiver. In this manner the secondary receiver may not be awake as often or may not be awake when access points are not available, or at least the common functions will be not be powered up and down as often.

Figure 2:
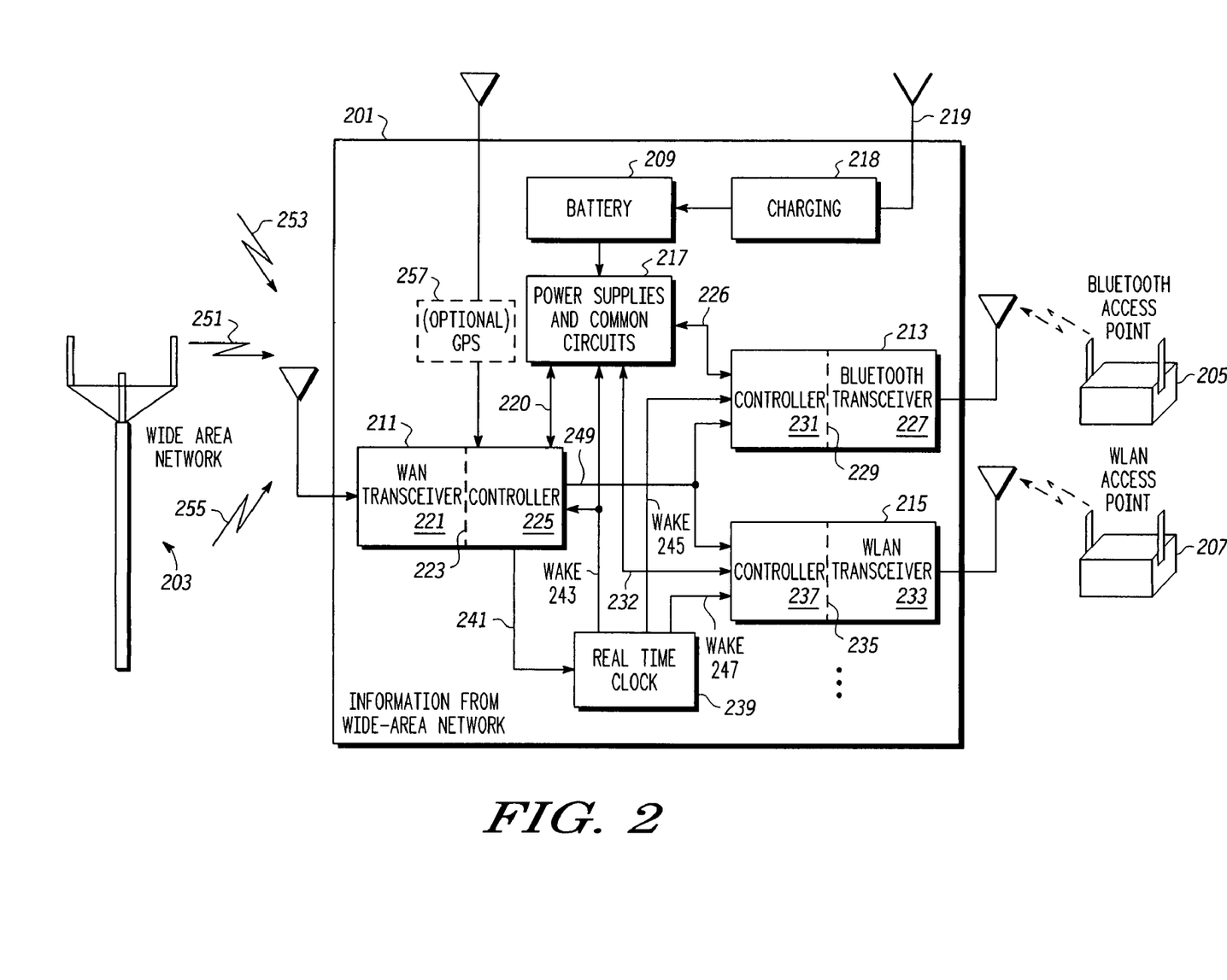
FIG. 2 in a simplified and representative form, shows a more detailed diagram of a communication device with a plurality of receivers that is arranged to extend battery life in accordance with one or more embodiments.

Referring to FIG. 2, another simplified, representative, and more detailed diagram of a communication device 201 with a plurality of receivers that is arranged to extend battery life in accordance with one or more embodiments will be briefly discussed and described. The communication device 201 is similar to device 101, but shown in additional detail. The device 201 is a portable or mobile communication device that may access a first or WAN network 203 as well as one or more access points, e.g., a Bluetooth access point 205 or WLAN access point 207. A battery 209 supplies power to a WAN function or modem 211 as well as one or more of a Bluetooth function or modem 213 and WLAN function or modem 215. More specifically the battery 209 supplies battery power to power supplies 217 and other common circuits or functions (user interface, etc.). The power supplies operate to condition and regulate the battery power and thus provide various power supply voltages that are typically device design and architecture specific all as known. The battery 209 is charged via the charging function 218 when it is supplied at 219 by an external power source, e.g., battery charger, car battery or the like as is known.

The power supplies and other common circuitry 217 are intercoupled, via one or more busses and control leads 220 as needed to the WAN modem 211. The WAN modem includes a known WAN transceiver 221 and thus receiver that is the primary transceiver for the communication device. The WAN transceiver is coupled at an interface 223 to a controller 225, e.g., microprocessor or digital signal processor based controller as is known. The primary transceiver and thus primary receiver is configured to operate on or with a first network, e.g., a GSM, CDMA, WCDMA, or the like WAN in accordance with applicable protocols that may vary with the particular network.

For example, the WAN transceiver when operating in GSM, CDMA, WCDMA, etc. networks spends most of the time (i.e., when not in an active phone call or other data exchange) periodically monitoring a paging indicator channel (PICH) and looking for its particular paging indicator (PI). When the PI is detected as set, the following frame of the paging channel (PCH) will be monitored by the WAN receiver for specifics of the page. During those time periods when the WAN transceiver (receiver) is not monitoring the PICH for its PI, it and any associated power consuming functions or circuitry can be powered off or sleeping. At the proper time the receiver, etc will enter a wake cycle, i.e., wake up or be powered up in order to function appropriately. This process is referred to as Discontinuous Reception (DRX) mode or a DRX cycle. In these system the network infrastructure is responsible for determining and notifying respective communication devices and thus transceivers of the length of the DRX cycle as well as their respective schedules (i.e., when within the DRX cycle a given device should monitor the PICH for its respective PI. Note that, for example, the DRX cycle may be as much as 4+ seconds in length with typical GSM systems operating with a 1.67 second DRX cycle and WCDMA systems using a 1.28 second DRX cycle length. The wake time for a typical receiver (monitoring for its PI) can be 3-7 milliseconds. Thus a significant portion of time can be spent in a sleep mode with corresponding battery conservation and battery life extension and yet the communication device is "connected to" and can still be reached via the WAN when or as desired.

Furthermore, the power supplies and other common circuitry 217 are intercoupled, via one or more busses and control leads 226 as needed to the Bluetooth modem 213. The Bluetooth modem includes a known Bluetooth transceiver 227 and thus secondary receiver that is at least one possible secondary transceiver for the communication device 101. The Bluetooth transceiver is coupled at an interface 229 to a controller 231, e.g., microprocessor or digital signal processor based controller as is known. The secondary transceiver and thus secondary receiver is configured and arranged to access and operate as a short range receiver with the Bluetooth access point 205 or the like in accordance with applicable Bluetooth protocols. It is noted that other personal area network (PAN) interconnect protocols have been proposed and that additional ones may be proposed and utilized and that the concepts and principles discussed and described herein are likely applicable to other PAN protocols and transceivers.

Additionally, the power supplies and other common circuitry 217 are intercoupled, via one or more busses and control leads 232 as needed to the WLAN modem 215. The WLAN modem includes a known WLAN transceiver 233 and thus secondary receiver (IEEE 802.11, IEEE 802.16, etc.) that is at least one other possible secondary transceiver for the communication device 101. The WLAN transceiver is coupled at an interface 235 to a controller 237, e.g., microprocessor or digital signal processor based controller as is known. The secondary transceiver and thus secondary receiver is configured to access and operate with the WLAN access point 207 or the like in accordance with applicable WLAN protocols. It is noted that other local or wireless local area network (LAN or WLAN) interconnect protocols have been proposed (commonly referred to as WiFi, WiDiFi, WiMAX, HiperLan) and that additional ones may be proposed and utilized and that the concepts and principles discussed and described herein are likely applicable to other WLAN protocols and transceivers.

It is noted that the PAN or Bluetooth modem and WLAN modem are shown as separate entities, however in practice it may be appropriate or desirable to combine these into one transceiver entity that may be re-arranged to operate with either PAN or WLAN protocols. Further either of the modems may be arranged to support more than one PAN or WLAN protocol as needed. It will also be appreciated by those of ordinary skill that the controllers 225, 231, 237, while shown as three distinct entities, may in practice be embodied as or combined into less than three controllers or even into one controller. Some of the discussions below will refer to a controller in the context of a combination of two or more of the controllers 225, 231, 237.

One significant distinction between the WAN function or modem and network versus the PAN or WLAN function results from the observation that the WAN network is nearly always available for nearly all of the communication devices in the network whereas access points for either a PAN or WLAN function or modem may only be available a small amount of the time for many if not all of the communication devices. Thus it may not be possible for most communication devices to be "connected to" a PAN or WLAN much of the time. Furthermore much of any battery charge or power consumed in an attempt to locate and access a corresponding access point by either the PAN, i.e., Bluetooth modem 213 or WLAN modem 215, will be wasted. This is in addition to extra power consumed with independent and uncorrelated wake up cycles for the PAN or WLAN modems. Note that for purposes of this discussion, the primary concern for the secondary receivers is determining whether an access point is providing a signal that is sufficiently strong to form a connection. Details of forming the connection, i.e., accessing the access point, are not further relevant and will not be discussed.

The FIG. 2 communication device is arranged and constructed so as to mitigate or eliminate some or much of this wasted battery power. A controller (225 and 231 or 237) is coupled to the primary (WAN) receiver and the secondary (Bluetooth or WLAN) receiver and further configured to control the secondary receiver in accordance with information obtained from the primary receiver as further discussed below.

The FIG. 2 Communication device 201 is further arranged in one or more embodiments such that the controller further wakes up the secondary receiver in accordance with information corresponding to a discontinuous reception (DRX) cycle (discussed above) where this information is obtained from the primary receiver via the first network, e.g., the WAN 203. As suggested above the information related to the DRX cycle is used, e.g., by the controller, to control the primary receiver, specifically the duty cycle of the primary receiver. The communication device 201, specifically WAN transceiver 221 can receive the DRX cycle information from the WAN 203, process and provide this information or information corresponding thereto via the controller 225.

For example, the information related to the DRX cycle (schedule and cycle duration) can be used to set or program a real time clock 239 via the inter coupling 241 in a known manner. As will be appreciated, the real time clock is a known function that consumes minimal power, is likely powered from the battery 209 or possibly a secondary battery coupled to the battery 209 (not shown) with sufficient timing accuracy to maintain time at least for the duration of a DRX cycle. Once set or programmed, the real time clock 239 can be used to generate a wake signal at 243 that can be used to wake up the power supplies, etc. 217 and the controller 225. The real time clock can generate other wake signals at 245, 247 that may be used to wake up or at least provide a wake up signal to the secondary receivers, e.g., Bluetooth and WLAN modems 213, 215 or corresponding controllers 231, 237. Note that alternatively the controller via the inter coupling at 249 and interfaces 229, 235 can be used to generate appropriate wake up signals or to wake up the secondary receivers. Note that the wake signals from the real time clock can be sequenced to, e.g., wake up the power supplies slightly before the controller (s) or associated transceivers if desired. Thus the communication device in various embodiments comprises the real time clock 239 that can be used to wake up the controller(s) 225, 231, 237 in accordance with the DRX cycle and one or more of the controllers and further synchronize wake periods of the secondary receiver to the DRX cycle.

Alternatively, the communication device, e.g., the controller can obtain, from the primary receiver, information corresponding to availability of one or more access points that are configured to support a wireless short range protocol and then wake up the secondary receiver when access points are available based on this information. For example, this information regarding availability can be provided in an overhead message or a short message service (SMS) message either by the WAN system operator or another entity using the WAN system. This information corresponding to availability may comprise location information as well as the type of access points (in terms of access protocols and the like) that are available at these locations.

The location information can be in terms of latitude longitude information or be in terms of available signals 251, 253, 255 from different transmitting sites in the WAN, e.g., identification information carried by these signals that identifies, for example a given transmitting site for the signal. If the information is in terms of latitude longitude for the location of the access points, the communication unit can determine its own location by triangulation calculations using the signals 251, 253, 255 using known techniques. Alternatively, the communication device 201 may include a Global Positioning System (GPS) receiver 257 or otherwise have available GPS location information (from an external source—not shown).

In any event, the controller in some embodiments can compare location information for the communication device with the information corresponding to availability of one or more access points and when the location information compares favorably with the information corresponding to availability of one or more access points, wake up the secondary receiver in a mode that is compatible with the one or more access points.

It will be appreciated that the communication device 201 of FIG. 2 or other devices may be implemented at least in part as one or more integrated circuits where the integrated circuit is arranged and configured to extend battery life in some device. In one embodiment, for example the integrated circuit includes a first interface 223 configured to provide an interface to a primary receiver 221 that is operable on a first network 203; a second interface 229, 235 configured to provide an interface to a secondary receiver 227, 233 that is a wireless short range receiver; and a controller 225, 231, 237 coupled to the first interface and the second interface. The controller is configured to facilitate operation of the primary receiver on the first network, obtain information from the primary receiver; and then facilitate operation of the secondary receiver, e.g., wake up the secondary receiver in accordance with the information obtained from the primary receiver.

The integrated circuit may further include at least a portion of the primary receiver, where, for example, the primary receiver is operable on a cellular communication network or other public access network. In yet other embodiments, the integrated circuit can further comprise at least a portion of the secondary receiver, where, for example, the secondary receiver includes a wireless local area network (WLAN) receiver, a Bluetooth receiver, ultra wideband receiver, or the like.

Similar to the discussions above, the controller in some embodiments further obtains information, from the primary receiver, corresponding to a discontinuous reception (DRX) cycle, facilitates operation of the primary receiver in accordance with the DRX cycle, and only wakes up the secondary receiver in accordance with a duty cycle that is synchronized to the DRX cycle. The controller may only wake up the secondary receiver in accordance with a duty cycle corresponding to a fraction of wake periods for the primary receiver. In other embodiments the controller further obtains, from the primary receiver, information corresponding to availability of one or more access points that are configured to support a wireless short range protocol. The controller in some embodiments may only facilitate wake up of the secondary receiver when access points that are compatible with the secondary receiver are available based on the information corresponding to availability of the one or more access points. This may be facilitated by some form of location information and a comparison with the availability information.

Figure 3:
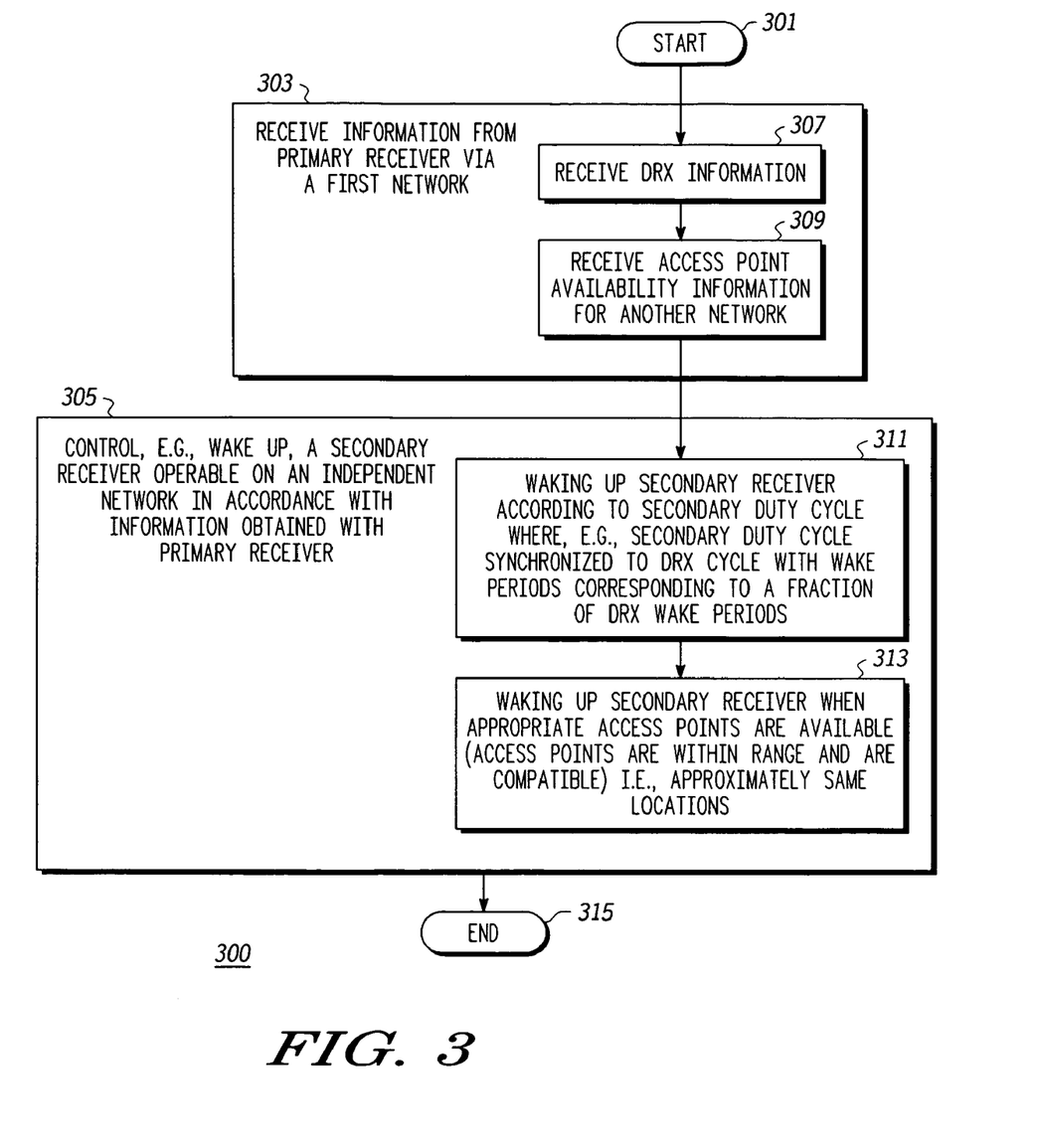
FIG. 3 depicts a flow chart of a representative embodiment of a method of extending battery life.

Referring to FIG. 3, an exemplary embodiment of a flow chart of a method embodiment of extending battery life will be discussed and described. It will be appreciated that this method uses many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures. FIG. 3 shows an embodiment of a method 300 of extending battery life in, for example, a communication device where the device has a plurality of receivers. The method begins at 301 and then at 303 shows receiving information with or using a primary receiver that is configured to operate on a first network, e.g., a public access subscriber network. Next the method includes controlling a secondary receiver that is configured to operate on a second network 305 or in conjunction with an access point, where the second network is independent from the first network. The second network may include, for example, one or more access points for unlicensed mobile access. For instance the access points may support a connection using a Bluetooth protocol, WLAN protocol, Ultra Wideband protocol, or the like. The controlling may include waking up the secondary receiver in accordance with the information obtained with the primary receiver.

The receiving the information with the primary receiver 303 can include receiving various types of information, such as receiving information corresponding to a discontinuous reception (DRX) cycle for the primary receiver 307. In another example, the receiving the information with the primary receiver further comprises receiving information corresponding to availability of access points associated with one or more other networks 309. It is noted that various embodiments of the method 300 may include either 307 or 309 or may include both 307 and 309.

Similarly, the controlling the secondary receiver 305 may further comprise only waking up the secondary receiver according to a secondary duty cycle that corresponds to the DRX cycle 311. In some embodiments, the secondary duty cycle can be synchronized to the DRX cycle and include wake periods for the secondary receiver corresponding to a fraction (vary from a small fraction, e.g., ⅛ up to a large fraction, e.g., 1) of wake periods for the primary receiver. The process at 311 is advantageous when the process at 307 is used.

The method 300, specifically the controlling the secondary receiver 305 can further comprise only waking up the secondary receiver when access points that are compatible with the secondary receiver are available 313 based on the information corresponding to availability of access points received at 309. The controlling the secondary receiver can include comparing location information for the communication device or other device to the information corresponding to availability of access points and only waking up the secondary receiver when the location information compares favorably with the information corresponding to availability of access points, e.g., in terms of location and compatibility of the access points and the secondary receiver. Various embodiments of the method 300 may include 311 or 313 or both 311 and 313, with this typically being determined by the processes included at 303. The method ends at 315 but may be repeated as appropriate.

Figure 4:
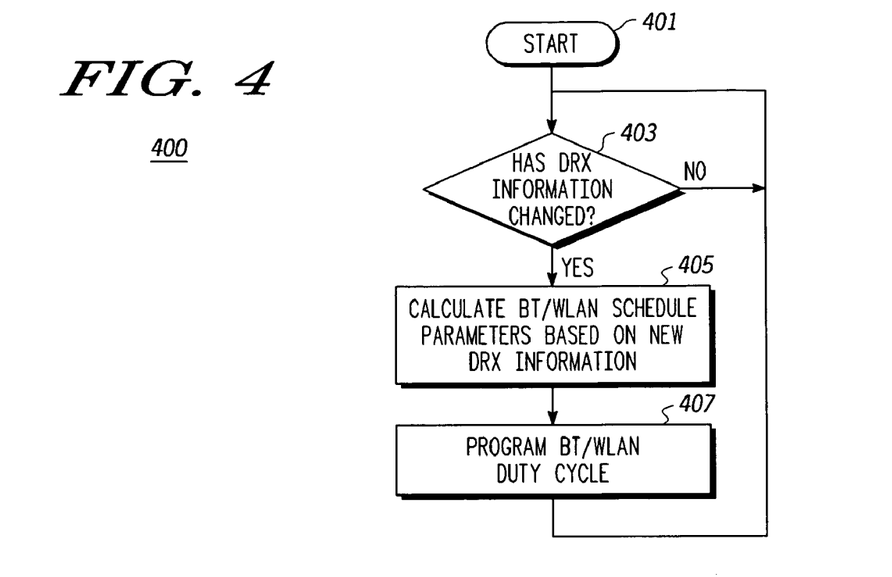
FIG. 4 depicts a flow chart of a representative embodiment of a method of providing a secondary duty cycle corresponding to information from a primary network and receiver.

Referring to FIG. 4, a flow chart of a representative embodiment of a method of providing a secondary duty cycle corresponding to information from a primary network and receiver will be discussed and described. In FIG. 4 a flow chart of the processes that can be used to provide or update and thus program an appropriate duty cycle for one or more secondary receivers is shown. This method may be used to augment the method of FIG. 3 or otherwise and can be implemented with one or more of the structures described above or other similarly arranged structures. While FIG. 4 is shown in the context of Bluetooth or WLAN functionality it will be appreciated that this approach is applicable to all forms of secondary receivers. The method 400 begins at 401 and then determines whether DRX information has changed 403. As noted above the DRX cycle duration as well as schedule (when to monitor for a PI) for a particular communication device is controlled by the network or network infrastructure and may be varied with network load or other network management priorities. If the DRX information has not changed, the method 400 continues to check for any changes.

When the DRX information has changed, new schedule parameters for one or more of the secondary receiver(s) (Bluetooth, WLAN, UWB, etc) are determined 405. For example, the secondary duty cycle can be realigned with or synchronized to a new DRX cycle. Once the new secondary duty cycle or schedule parameters are calculated or determined, the secondary receivers or associated controlling entity, e.g., controllers or real time clock, can be programmed or otherwise provided with the new duty cycle information 407. The method 400 may be repeated as needed.

Figure 5:
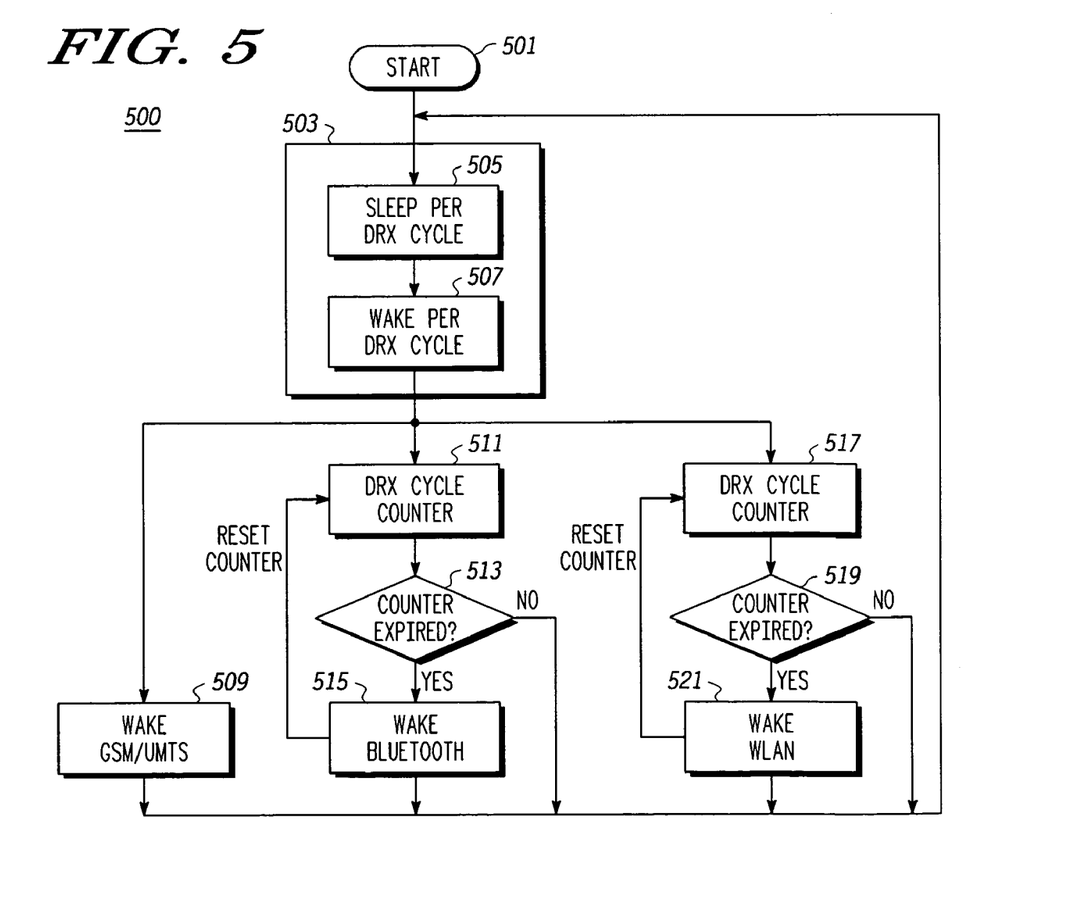
FIG. 5 depicts a flow chart of a representative embodiment of a method of providing a secondary duty cycle synchronized to a primary duty cycle.

Referring to FIG. 5, a flow chart of a representative embodiment of a method of determining and providing a secondary duty cycle that corresponds to or is synchronized to a primary duty cycle will be described and discussed. This method may be used to augment the method of FIG. 3 or otherwise and can be implemented with one or more of the structures described above or other similarly arranged structures. The FIG. 5 method 500 depicts processes at a high level that a real time clock or real time clock together with one or more controllers such as those described in conjunction with FIG. 2 may practice or execute as part of a battery conservation or extension process or methodology. The method is discussed in the context of a WAN receiver, such as a GSM or UMTS receiver, and an unlicensed mobile access receiver, such as a Bluetooth or WLAN receiver but would be applicable to other primary and secondary receivers or functions. The method 500 begins at 501 and then 503 illustrates sleeping in accordance with the DRX cycle 505 and then waking per that cycle 507 as is known. This can be practiced, for example, by a real time clock together with a counter that is preloaded with an appropriate value, counts clock cycles and generates an output or a wake signal at the appropriate count as will be appreciated by those of ordinary skill.

The wake signal can be used to wake up a GSM/UMTS function or receiver or associated controller 509. The wake signal can also be used to change a DRX cycle counter 511, determine whether the counter has expired 513, and if so wake up a Bluetooth modem or receiver 515 and reset the counter. The wake signal can further be used to change another DRX cycle counter 517, determine whether the counter has expired 519, and if so wake up a WLAN modem or receiver 521 and reset the corresponding counter. After the WAN modem has been awake or powered up, either counter has not expired 513, 519, or either secondary function or modem has been awake, the method repeats from 503. Note that by setting the DRX cycle counter at 511, 517 with different values the Bluetooth receiver or modem and WLAN modem will each be powered up synchronously with the WAN modem, however they can be powered up according to a differing fraction of the DRX cycles. For example, the WLAN modem can be powered up on every DRX cycle while the Bluetooth modem is powered up on every fifth cycle or the like.

Figure 6:
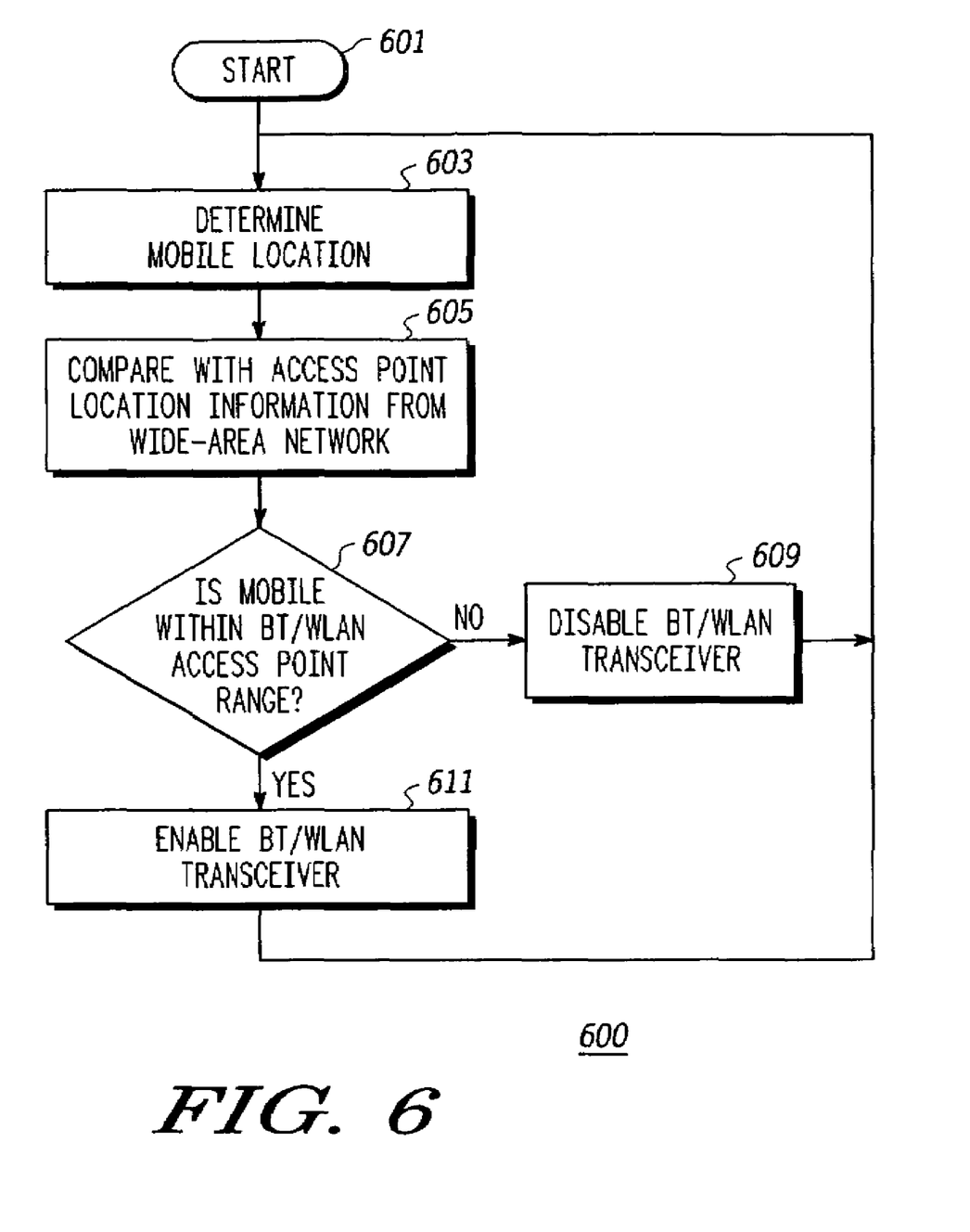
FIG. 6 shows a flow chart of a representative embodiment of a method of controlling a secondary receiver according to information from a primary network and receiver.

Referring to FIG. 6, a flow chart of a representative embodiment of a method of controlling a secondary receiver according to information from a primary network and receiver will be discussed and described. FIG. 6 illustrates a method 600 that focuses on using availability of access point information to determine whether to wake up a secondary receiver. This method may be used to augment the method of FIG. 3 or otherwise and can be implemented with one or more of the structures described above or other similarly arranged structures. The method 600 begins at 601 and determines a communication device or mobile unit location 603. This location information may be determined from GPS coordinates, triangulation, or the like. This location information for the communication device is compared with access point location information 605 as obtained from the primary network, e.g., WAN or the like, and corresponding primary receiver. If the mobile unit is not within range of an access point, e.g., Bluetooth, WLAN, UWB, etc. access point 607, the corresponding receiver or modem is not enabled, e.g., it is disabled 609 and the method repeats as appropriate. If the mobile unit is within range of an appropriate access point, the respective secondary modem or receiver, e.g., Bluetooth or WLAN transceiver, is enabled 611 and the method repeats as needed.

It is noted and will be evident to those of ordinary skill that the methods 400, 500, 600 may each or any part in any combination be used together with the method 300 to further improve extending battery life. For example, the wake signal provided as part of the synchronization with the DRX cycle can be subjected to the further determination of an available access point. Advantageously one or more of these methods can be applied to other forms of secondary modems or functions as well as other forms of information that may be provided from a primary network.

The processes, apparatus, and systems, discussed above, and the inventive principles thereof are intended to and can alleviate battery life problems caused by prior art communication devices with multiple receivers. Using these principles of controlling a secondary receiver in accordance with information obtained via a primary receiver and associated primary network and when practical coordinating, e.g., synchronizing, one or more secondary receivers with the primary receiver in terms of wake times, will facilitate battery life conservation or extension with little if any increase in costs and the like. By synchronizing a secondary function or receiver with a primary function or receiver little if any additional access latency for the secondary function will be evident, particularly when the primary receiver is operating on a network where access latency has already been addressed via for example, a DRX process or mode. Using one or more of the above discussed techniques and systems will allow a given user to take advantage of the typically significantly longer battery life. This will decrease the inconvenience factor associated with recharging batteries in portable equipment and thus contribute to increased user satisfaction. Given that communication devices and other portable devices continue to include additional functionality in the respective devices, the application of the inventive techniques, concepts, and principles discussed and described herein is expected to be broad based.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of extending battery life in a communication device having a plurality of receivers, the method comprising:

receiving information with a primary receiver that is configured to operate on a first network; and controlling a secondary receiver that is configured to operate on a second network that is independent from and uncorrelated with the first network, the controlling further comprising waking up the secondary receiver in accordance with the information obtained with the primary receiver, wherein the receiving the information with the primary receiver further comprises receiving information corresponding to availability of access points associated with one or more other networks, and wherein the controlling the secondary receiver further comprises only waking up the secondary receiver when access points that are compatible with the secondary receiver are available based on the information corresponding to availability of access points.

2. The method of claim 1 wherein the receiving the information with the primary receiver further comprises receiving information corresponding to a discontinuous reception (DRX) cycle for the primary receiver.

3. The method of claim 2 wherein the controlling the secondary receiver further comprises only waking up the secondary receiver according to a secondary duty cycle that corresponds to the DRX cycle.

4. The method of claim 3 wherein the secondary duty cycle is synchronized to the DRX cycle and includes wake periods for the secondary receiver corresponding to a fraction of wake periods for the primary receiver.

5. The method of claim 1 wherein the receiving the information with the primary receiver further comprises receiving information corresponding to availability of access points associated with one or more other wireless short range networks.

6. The method of claim 1 wherein the controlling the secondary receiver further comprises only waking up the secondary receiver when short range wireless access points are available.

7. The method of claim 1 wherein the controlling the secondary receiver further comprises comparing location information for the communication device to the information corresponding to availability of access points and only waking up the secondary receiver when the location information compares favorably with the information corresponding to availability of access points in terms of location and compatibility of the access points and the secondary receiver.

8. An integrated circuit arranged and configured to extend battery life in a communication device, the integrated circuit comprising:

a first interface configured to provide an interface to a primary receiver that is operable on a first network;

a second interface configured to provide an interface to a secondary receiver that is a wireless short range receiver which is operable on an independent and non synchronized network; and a controller coupled to the first interface and the second interface, the controller configured to:

facilitate operation of the primary receiver on the first network and obtain information from the primary receiver; and facilitate operation of the secondary receiver and wake up the secondary receiver in accordance with the information obtained from the primary receiver, wherein the controller further obtains information, from the primary receiver, corresponding to availability of one or more access points configured to support a wireless short range protocol, and wherein the controller further only facilitates wake up of the secondary receiver when access points that are compatible with the secondary receiver are available based on the information corresponding to availability of the one or more access points.

9. The integrated circuit of claim 8 further comprising at least a portion of the primary receiver, wherein the primary receiver is operable on a public access communication network.

10. The integrated circuit of claim 9 further comprising at least a portion of the secondary receiver, the secondary receiver comprising at least one of a wireless local area network (WLAN) receiver, a Bluetooth receiver, and an ultra wideband receiver.

11. The integrated circuit of claim 8 wherein the controller further obtains information, from the primary receiver, corresponding to a discontinuous reception (DRX) cycle, facilitates operation of the primary receiver in accordance with the DRX cycle, and only wakes up the secondary receiver in accordance with a duty cycle that is synchronized to the DRX cycle.

12. The integrated circuit of claim 11 wherein the controller further only wakes up the secondary receiver in accordance with a duty cycle corresponding to a fraction of wake periods for the primary receiver.

13. A communication device arranged and configured to extend battery life, the communication device comprising:

a primary receiver configured to operate on a first network;

a secondary receiver configured and arranged to operate as a short range receiver with an access point that is independent of and not synchronized with the first network; and a controller, coupled to the primary receiver and the secondary receiver, that is configured to control the secondary receiver in accordance with information obtained from the primary receiver, wherein the controller further obtains, from the primary receiver, information corresponding to availability of one or more access points configured to support a wireless short range protocol and only wakes up the secondary receiver when access points are available based on the information corresponding to availability of one or more access points.

14. The communication device of claim 13 wherein the primary receiver further comprises a wide area network (WAN) receiver and the secondary receiver further comprises an unlicensed mobile access receiver.

15. The communication device of claim 13 wherein the controller further wakes up the secondary receiver in accordance with information corresponding to a discontinuous reception (DRX) cycle obtained from the primary receiver and used by the controller to control the primary receiver.

16. The communication device of claim 15 further comprising a real time clock that wakes up the controller in accordance with the DRX cycle, wherein the controller further synchronizes wake periods of the secondary receiver to the DRX cycle.

17. The communication device of claim 13 wherein the controller further compares location information for the communication device with the information corresponding to availability of one or more access points and only when the location information compares favorably with the information corresponding to availability of one or more access points, wakes up the secondary receiver in a mode that is compatible with the one or more access points.

* * * * *